United States Patent
Wang et al.

(10) Patent No.: US 11,665,673 B2
(45) Date of Patent: May 30, 2023

(54) TRANSMITTING APPARATUS, RECEIVING APPARATUS AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 167 days.

(21) Appl. No.: 17/256,107

(22) PCT Filed: Nov. 1, 2018

(86) PCT No.: PCT/CN2018/113536
§ 371 (c)(1),
(2) Date: Dec. 24, 2020

(87) PCT Pub. No.: WO2020/087474
PCT Pub. Date: May 7, 2020

(65) Prior Publication Data
US 2021/0274473 A1    Sep. 2, 2021

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/20* (2023.01)

(58) Field of Classification Search
CPC ............ H04W 72/02; H04W 72/0406; H04W 72/0453
See application file for complete search history.

(56) References Cited

U.S. PATENT DOCUMENTS

2017/0006658 A1    1/2017 Jung et al.
2017/0048786 A1    2/2017 Belleschi et al.
(Continued)

FOREIGN PATENT DOCUMENTS

EP    3 200 528         8/2017
JP    2017513431 A      5/2017
(Continued)

OTHER PUBLICATIONS

International Search Report, dated Jul. 25, 2019, for corresponding International Application No. PCT/CN2018/113536, 2 pages.

*Primary Examiner* — Raj Jain
(74) *Attorney, Agent, or Firm* — Seed IP Law Group LLP

(57) ABSTRACT

Provided are a transmitting apparatus, receiving apparatus and wireless communication methods related to resource configuration for sidelink communication, sidelink discovery or any other sidelink operation in NR. A transmitting apparatus, comprising: circuitry, operative to allocate resources for Physical Sidelink Shared Channel (PSSCH) based on a common resource allocation reference and indicate the resource allocation via Physical Sidelink Control Channel (PSCCH) which is used by a receiving apparatus to obtain the allocated resources; and a transmitter, operative to transmit PSCCH and associated PSSCH on the allocated resources to the receiving apparatus.

18 Claims, 13 Drawing Sheets

(51) Int. Cl.
*H04W 72/0453* (2023.01)
*H04W 72/20* (2023.01)

(56) References Cited

U.S. PATENT DOCUMENTS

| | | | |
|---|---|---|---|
| 2017/0127287 A1 | 5/2017 | Fujishiro et al. | |
| 2017/0188391 A1 | 6/2017 | Rajagopal et al. | |
| 2018/0098369 A1* | 4/2018 | Yasukawa | H04W 72/02 |
| 2018/0110037 A1 | 4/2018 | Yasukawa et al. | |
| 2020/0099479 A1* | 3/2020 | Park | H04W 4/70 |
| 2020/0367204 A1* | 11/2020 | Li | H04W 72/0446 |
| 2021/0274473 A1* | 9/2021 | Wang | H04W 72/0453 |
| 2022/0022178 A1* | 1/2022 | Wang | H04L 5/0053 |

FOREIGN PATENT DOCUMENTS

| | | |
|---|---|---|
| WO | WO 2015141847 A1 | 9/2015 |
| WO | WO 2016159007 A1 | 10/2016 |

\* cited by examiner

TRANSMITTING APPARATUS, RECEIVING APPARATUS AND WIRELESS COMMUNICATION METHOD

BACKGROUND

1. Technical Field

The present disclosure relates to wireless communication field, and in particular, to wireless communication apparatus such as a user equipment (UE), and a base station (gNB), and wireless communication methods related to resource allocation for sidelink communication, sidelink discovery or any other sidelink operation in New Radio (NR) access technology.

2. Description of the Related Art

Bandwidth part (BWP) concept is adopted in NR and mainly targeted for power saving. For example, a UE can be operated in a wider BWP in a case that there is traffic and operated in a narrow BWP in a case of no traffic. In NR, maximum 4 BWPs can be configured in a carrier and only one BWP is active at one direction (downlink or uplink) at one time. Dynamic BWP switching via Downlink Control Information (DCI) is also supported.

So far, sidelink discussion in NR is still in a very initial phase and whether to have BWP or not for NR V2X sidelink is being discussed.

SUMMARY

One non-limiting and exemplary embodiment facilitates determining the resource for sidelink communication, sidelink discovery or any other sidelink operation in NR to guarantee the system performance.

In a first general aspect of the present disclosure, it is provided a transmitting apparatus, comprising: circuitry, operative to allocate resources for Physical Sidelink Shared Channel (PSSCH) based on a common resource allocation reference and indicate the resource allocation via Physical Sidelink Control Channel (PSCCH) which is used by a receiving apparatus to obtain the allocated resources; and a transmitter, operative to transmit PSCCH and associated PSSCH on the allocated resources to the receiving apparatus.

In a second general aspect of the present disclosure, it is provided a receiving apparatus, comprising: a receiver, operative to receive Physical Sidelink Shared Channel (PSSCH) on allocated resources and Physical Sidelink Control Channel (PSCCH); and circuitry, operative to obtain the allocated resource for the PSSCH based on a common resource allocation reference which is used by a transmitting apparatus for transmitting PSSCH on the allocate resources.

In a third general aspect of the present disclosure, there is provided a wireless communication method for a transmitting apparatus, comprising: allocating resources for Physical Sidelink Shared Channel (PSSCH) and indicate the resource allocation via Physical Sidelink Control Channel (PSCCH) based on a common resource allocation reference which is used by a receiving apparatus to obtain the allocated resources; and transmitting PSSCH on the allocated resources to the receiving apparatus.

In a fourth general aspect of the present disclosure, there is provided a wireless communication method for a receiving apparatus, comprising: receiving Physical Sidelink Control Channel (PSSCH) on allocated resources and associated Physical Sidelink Shared Channel (PSSCH); and obtaining the allocated resource for the PSSCH based on a common resource allocation reference which is used by a transmitting apparatus for transmitting PSSCH on the allocate resources.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
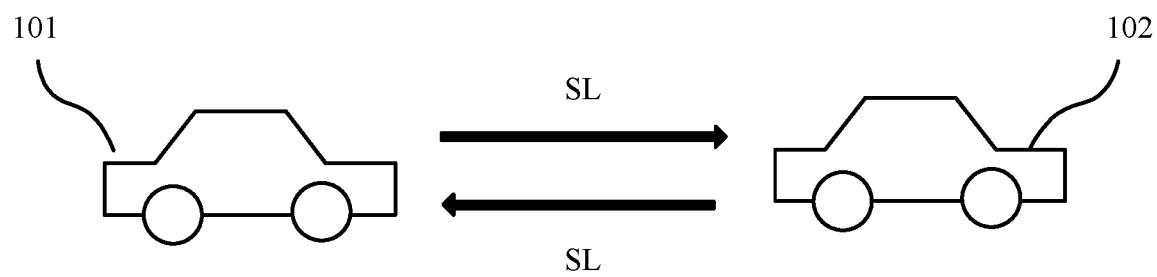
FIG. 1 schematically shows an exemplary scenario of sidelink transmission in NR.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

The concept of resource pool is adopted to indicate operated time/frequency location or time/frequency resources of sidelink reception/transmission in LTE V2X. Resource pool configuration is semi-statically indicated by RRC signaling and includes both time and frequency information in a carrier. For a UE, it is configured with transmitting (Tx) resource pool and receiving (Rx) resource pool. The former is used to transmit resource and the latter is used to receive resource.

In LTE, resource allocation is based on one carrier, and in NR, resource allocation is based on BWP (at least for DCI transmitted in UE-specific Search Space (USS)). For both LTE and NR, a UE and a base station have common understanding on resource allocation reference.

So far, sidelink discussion in NR is still in a very initial phase and whether to have BWP or not for NR V2X sidelink is being discussed. One possibility is no BWP defined/used for NR V2X sidelink. In addition, even BWP is defined or used in NR, more accurate resource allocation is also desired. In these cases, how a transmitting apparatus (e.g., a transmitting UE) and a receiving apparatus (e.g., a receiving UE) allocate resources is unclear.

Although the case of sidelink transmission is disclosed in the following embodiments, the present disclosure is not limited to the sidelink transmission and the skilled person could readily apply the same method or configuration can also apply to downlink/uplink transmission based thereon. For example, in downlink transmission, a transmitting apparatus can be referred to as a user equipment and a receiving apparatus can be referred to as a base station, and vice versa.

Further as described above, one possibility is no BWP defined/used for NR V2X sidelink. In these cases, a transmitting apparatus for transmitting sidelink transmissions based on its own transmitting resource pool and a receiving apparatus for receiving the sidelink transmissions based on its own receiving resource pool may not have a common understanding on resource allocation. Since the transmitting is based on the transmitting resource pool of the transmitting apparatus, and the receiving is based on the receiving resource pool of the receiving apparatus, which may be different from the transmitting resource pool of the transmitting apparatus, the receiving apparatus may not correctly interpret the received sidelink transmission and may not obtain correct resource allocation.

Now embodiments of the present disclosures will be described below to solve at least one of the above problems.

Figures 2A, 2B:
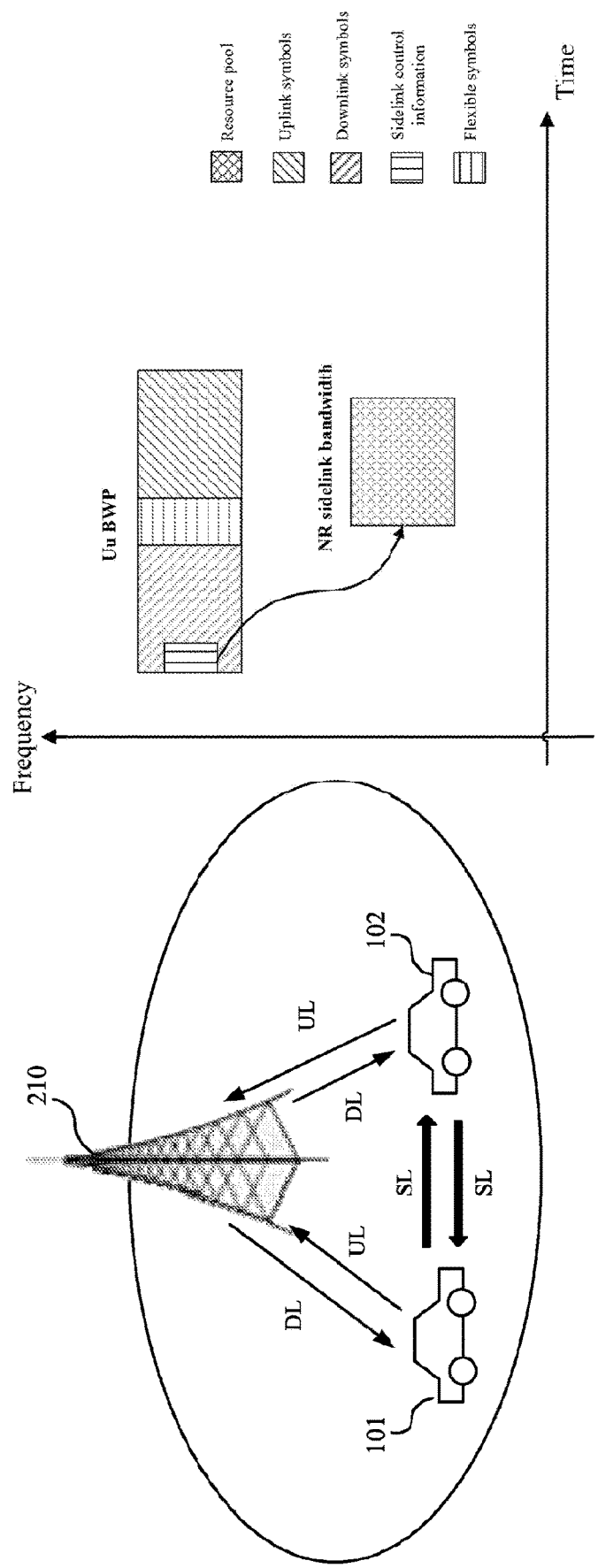
FIG. 2A schematically shows another exemplary scenario of sidelink transmission in NR.
FIG. 2B schematically shows an exemplary scenario of resource allocation reference for a transmitting apparatus and a receiving apparatus according to an embodiment of the present disclosure.

FIGS. 1 and 2A describe scenarios in which embodiments of the present disclosure could be applied.

FIG. 1 schematically shows an exemplary scenario of sidelink transmission and reception in NR. As shown in FIG. 1, data transmission may be transmitted from a vehicle 101 to a vehicle 102 via sidelink as shown by two thick arrows noted as "SL".

For example, in the embodiment, the vehicle 101 may allocate resource for a Physical Sidelink Shared Channel (PSSCH) based on a common resource allocation reference and indicate the resource allocation in Physical Sidelink Control Channel (PSCCH), which is used by the vehicle 102 to obtain the allocated resources, and then transmit the sidelink signal on the allocated resource to the vehicle 102.

FIG. 2A schematically shows another exemplary scenario of sidelink transmission in NR, i.e., an exemplary scenario of transmissions including sidelink, uplink and downlink transmissions in NR. Similarly to FIG. 1, in FIG. 2, communication may be performed between two vehicles 101 and 102 via sidelinks as shown by two thick arrows noted as "SL", For the purpose of avoiding redundancy, the same contents with that in FIG. 2A will not be described again. Different from FIG. 1, in FIG. 2, there is further a base station 310 and the two vehicles 101 and 102 are both in the coverage of the base station 310. Radio (Uu) interface communication may also be performed between each of the two vehicles 101 and 102 and the BS 310 as shown by respective thin arrows noted as "DL" or "UL".

The resource allocation based on a common resource allocation reference as described in FIG. 1 may also be applied to DL or UL transmission. Specifically, the base station 210 may allocate resource for a Physical Downlink Shared Channel (PDSCH) based on a common resource allocation reference and indicate the resource allocation in Physical Downlink Control Channel (PDCCH), which is used by the vehicle 101/102 to obtain the allocated resources, and then transmit the downlink signal on allocated resource to the vehicle 101/102. Or, the vehicle 101/102 may allocate resource for a Physical Uplink Shared Channel (PUSCH) based on a common resource allocation reference, and indicate the resource allocation in Physical Uplink Control Channel (PUCCH), which is used by the base station 210 to obtain the allocated resources, and then transmit the uplink signal on allocated resource to the vehicle 101/102.

FIG. 2B schematically shows an exemplary scenario of resource allocation reference for a transmitting apparatus and a receiving apparatus according to an embodiment of the present disclosure. Specifically, the slot in Uu BWP comprises: downlink symbols for downlink transmission, uplink symbols for uplink transmission, and flexible symbols, wherein the downlink symbols further comprises resources to transmit sidelink control information, which is used by the base station to allocate sidelink resources for vehicles 101/102.

In an embodiment, the base station allocates resources for Physical Downlink Shared Channel (PDSCH) based on the common resource allocation reference. Similarly, the allocation on Physical Uplink Shared Channel (PUSCH) can also be based on common resource allocation reference but the details are ignored.

Figure 3:
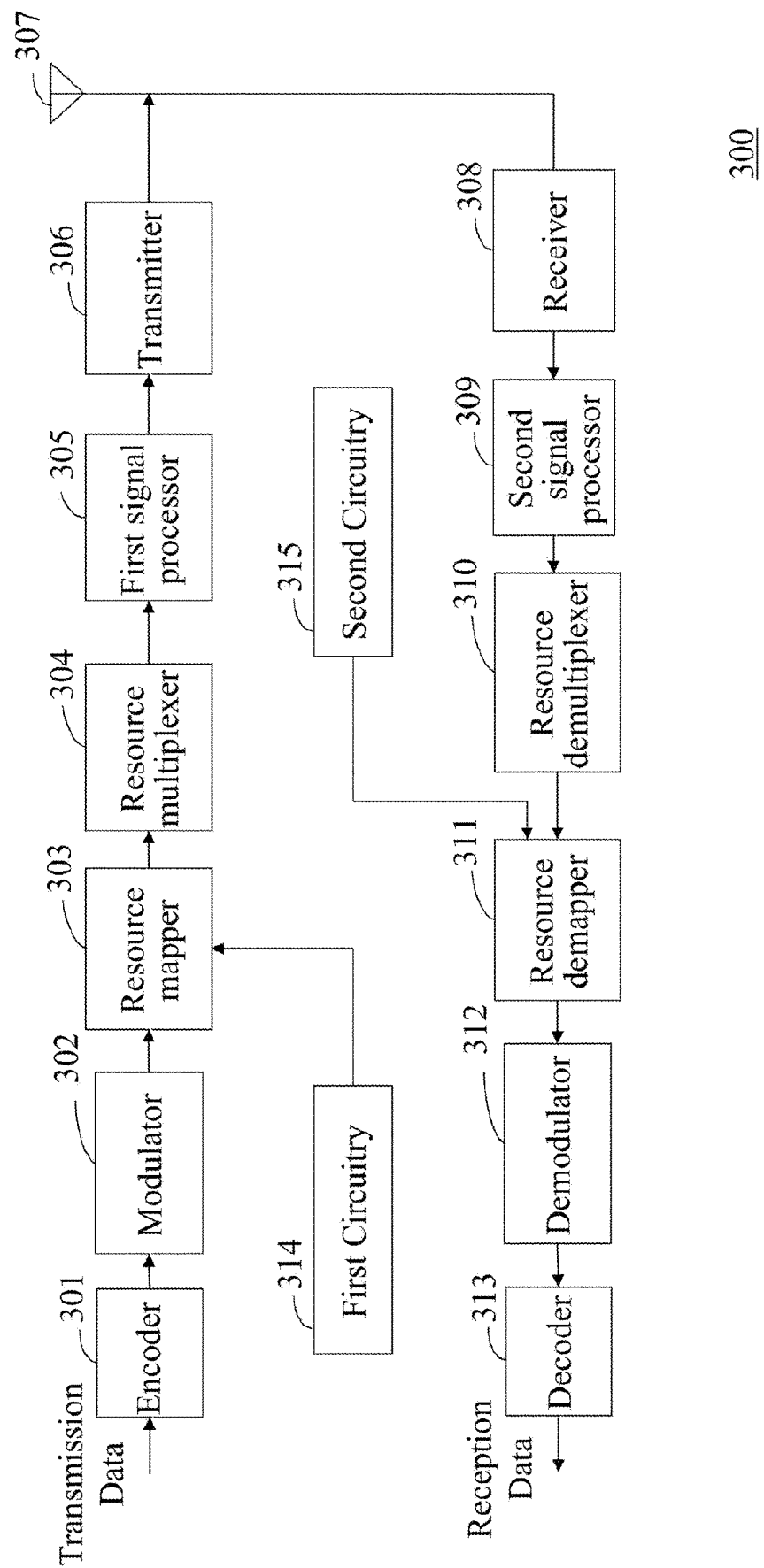
FIG. 3 illustrates a block diagram of details of a user equipment in a case of sidelink transmission according to an embodiment of the present disclosure.

FIG. 3 illustrates a block diagram of a communication system including a transmitting apparatus and a receiving apparatus according to an embodiment of the present disclosure; as shown in FIG. 3, the communication system 300 includes an encoder 301, a modulator 302, a resource mapper 303, a resource multiplexer 304, a first signal processor 305, a transmitter 306, an antenna 307, a receiver 308, a second signal processor 309, a resource demultiplexer 310, a resource demapper 311, a demodulator 312, a decoder 313, a first circuitry 314 and a second circuitry 315.

For example, at the transmitting apparatus, the encoder 301 performs encoding processing on transmission data, and the modulator 302 performs modulation processing on post-encoding transmission data to generate a data symbol. The resource mapper 303 maps the data symbol onto physical resources based on a common resource allocation reference under control of the first circuitry 314. For example, when a transmitting UE transmits sidelink data to a receiving UE, the resource mapper 303 maps the data symbol onto resource allocated for sidelink transmission. The resource multiplexer 304 multiplexes the data symbol and possible control information and/or synchronization information under control of the first circuitry 314. The first signal processor 305 performs the signal processing on the multiplexed signal output from the resource multiplexer 304. The transmitter 306 transmits the processed sidelink signal to, for example, a receiving apparatus via the antenna 307.

Here, the operations of the resource mapper 303 and the resource multiplexer 304 are controlled by the first circuitry 314. For example, the first circuitry 314 may allocate resources for PSSCH based on a common resource allocation reference and indicate the resource allocation via PSCCH in carrier(s). The resource mapper 303 maps the sidelink data symbol onto the allocated resources and the transmitter 306 transmits PSSCH on the allocated resources as well as PSCCH indicating such resource allocation to another UE.

Accordingly, at the receiving apparatus, the receiver 308 may receive a sidelink signal from the transmitting apparatus via the antenna 307. The second signal processor 309 performs the signal processing on the sidelink signal received by the receiver 308. The resource demultiplexer 310 demultiplexes the processed sidelink signal into sidelink data and possible sidelink control information and/or synchronization information. The resource demapper 311 demaps sidelink data, by interpreting the sidelink control information to obtain physical resources allocated for sidelink transmission, based on a common resource allocation reference under control of the second circuitry 315. The demodulatoer 312 performs demodulation processing on the sidelink data symbol and the decoder 313 performs decoding processing on the demodulated sidelink data symbol to obtain the reception data.

The above case may correspond to unlicensed carrier case, as described before, in which there is no Uu communication, and however, the present disclosure is not limited thereto. In a licensed carrier case, the communication system 300 may transmit uplink signals to a base station (for example, the BS 210 shown in FIG. 2) through the encoder 301, the modulator 302, the resource mapper 303, the resource multiplexer 304, the first signal processor 305, the transmitter 306, the antenna 307 and the first circuitry 314. For example, the first circuitry 314 may allocate resources for data transmission between the communication system 300 and the base station in the carrier(s) and indicate the resources allocated via control channel correspondingly. The transmitter 306 transmits the UL signal on the allocated resources for data transmission between the communication system 300 and the base station in the carrier(s) to the base station via the antenna 307.

Similarly, in a licensed carrier case, the communication system 300 may also receive downlink signals from a base station (for example, the BS 210 shown in FIG. 2) through the antenna 307, the receiver 308, the second signal processor 309, the resource demultiplexer 310, the resource demapper 311, the demodulator 312 and the decoder 313. Since the principle of receiving DL signals from a BS is well known to those skilled in the art, detailed description will not be provided in order to avoid redundancy.

Figure 4:
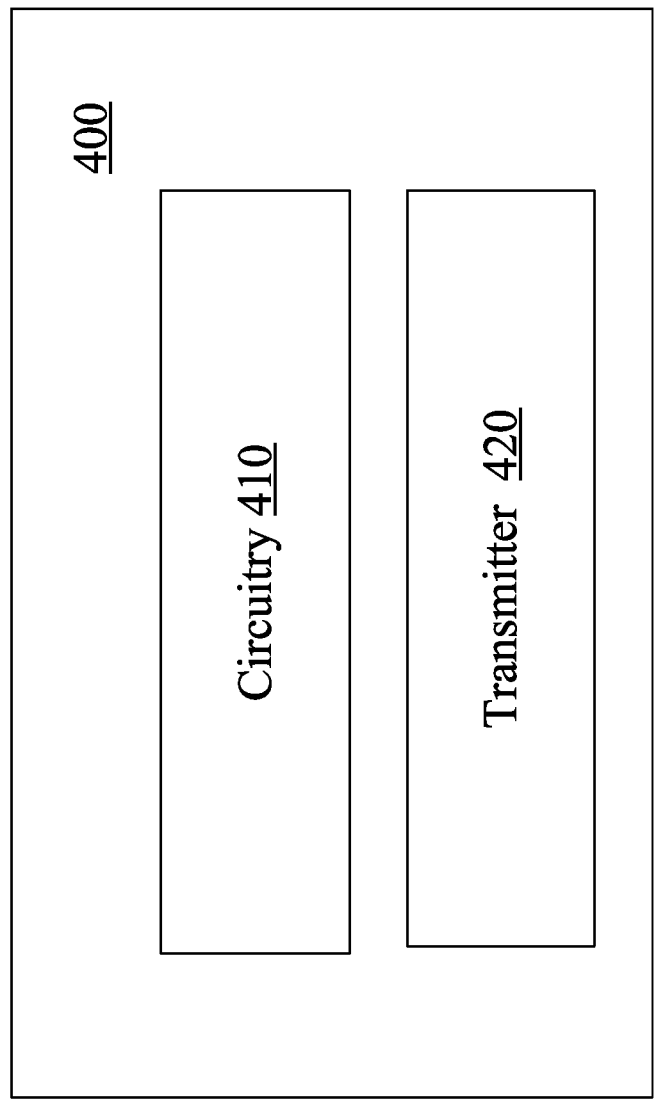
FIG. 4 illustrates a block diagram of an exemplary transmitting apparatus according to an embodiment of the present disclosure.

FIG. 4 illustrates a block diagram of an exemplary transmitting apparatus according to an embodiment of the present disclosure. The transmitting apparatus 400, comprising: circuitry 410, operative to allocate resources for Physical Sidelink Shared Channel (PSSCH) based on a common resource allocation reference and indicate the resource allocation via Physical Sidelink Control Channel (PSCCH) which is used by a receiving apparatus to obtain the allocated resources; and a transmitter 420, operative to transmit PSCCH and associated PSSCH on the allocated resources to the receiving apparatus.

As mentioned above, a case is described in which a transmitting apparatus uses its own transmitting resource pool as the resource reference to allocate resource while a receiving apparatus uses its own receiving resource pool, which is different from the transmitting resource pool of transmitting apparatus, to obtain the allocated resources, thus, the transmitting apparatus and the receiving apparatus would have different understanding on allocated resource, and the receiving apparatus may not correctly obtain the allocated resources. However, the common resource allocation reference as described in the present embodiment can establish a common understanding for resource allocation between the transmitting apparatus and the receiving apparatus, so that the receiving apparatus could interpret the received sidelink transmission based on the common resource allocation reference which has the same understanding between the transmitting apparatus and the receiving apparatus.

The transmitting apparatus 400 shown in FIG. 4 may be the vehicle 101 and a receiving apparatus communicating with the transmitting apparatus 400 may be the vehicle 102 in FIG. 1 and FIG. 2, and vice versa.

Note that, the transmitting apparatus 400 as shown in FIG. 4 may correspond to the communication system 300 shown in FIG. 3. The transmitter 420 may correspond to the transmitter 306. The circuitry 410 may correspond to the first circuitry 314 shown in FIG. 3.

In an embodiment, a Bandwidth Part (BWP) may not supported or used for the PSSCH and PSCCH transmission. In a further embodiment, even BWP is supported or used, the above configuration could also apply when a more accurate resource allocation is desired within the wide range of bandwidth covered by the BWP, for further power saving.

In an embodiment, the receiving resource pool of the transmitting apparatus may be used as the common resource allocation reference.

Figure 5:
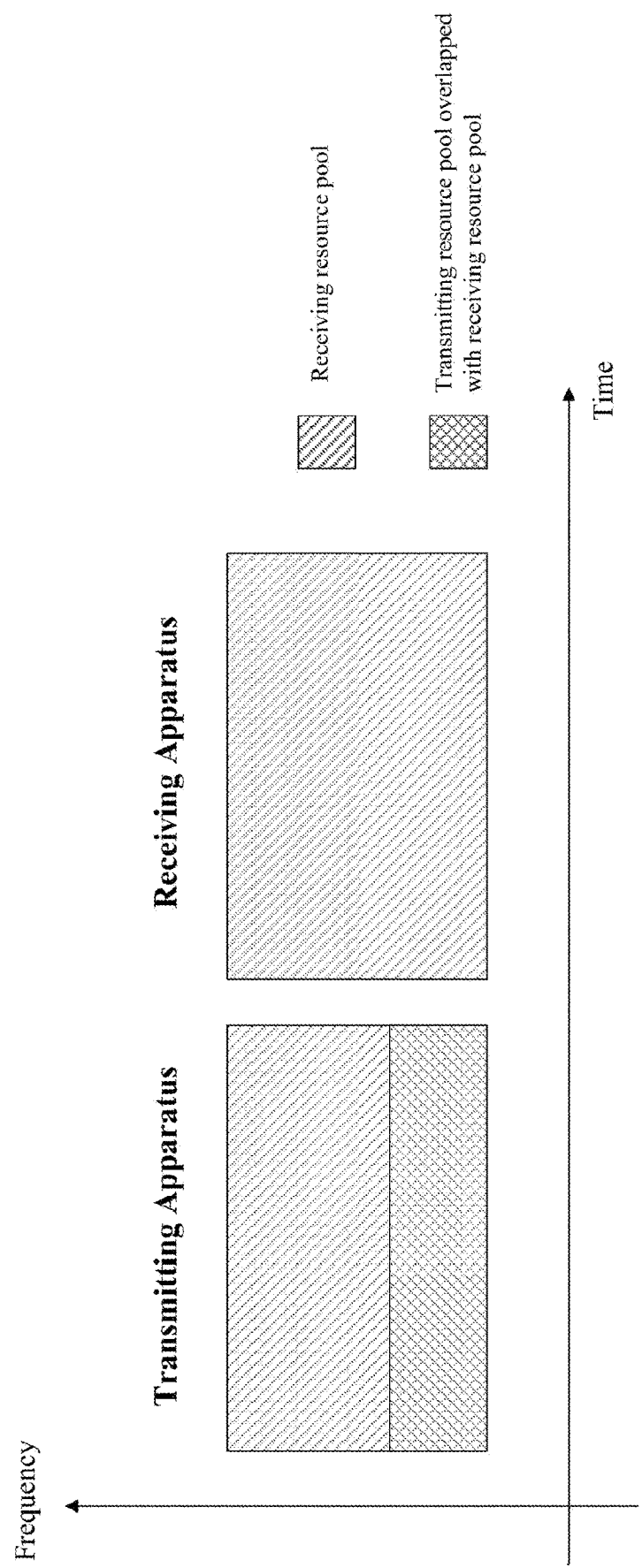
FIG. 5 schematically shows an exemplary scenario of resource allocation reference for a transmitting apparatus and a receiving apparatus according to an embodiment of the present disclosure.

FIG. 5 schematically shows an exemplary scenario of resource allocation reference for a transmitting apparatus and a receiving apparatus according to an embodiment of the present disclosure, wherein the receiving resource pool of the transmitting apparatus or the receiving apparatus is used as the common resource allocation reference.

It should be noted that the receiving resource pool and the transmitting resource pool can be one and the same physical resource pool, as well as separate resource pools. The terms of "receiving resource pool" and "transmitting resource pool" are for naming purpose indicating different functionality of the resource pool.

With the above configuration of the present disclosure, since the receiving resource pool of the transmitting apparatus or the receiving apparatus is used as the common resource allocation reference without changing the size or positions of PRBs of resource pools thereof, the complexity can be reduced by avoiding transmitting additional signaling indicating resource allocation reference to the receiving apparatus, thereby reducing the possibility of errors caused by signaling, and a better performance of power saving is achieved.

In an embodiment, in the case that the receiving resource pool of the transmitting apparatus is used as the common resource allocation reference, the transmitting resource pool of the transmitting apparatus is covered by the receiving resource pool of the transmitting apparatus, and in the case that the receiving resource pool of the receiving apparatus is used as the common resource allocation reference, a transmitting resource pool of the transmitting apparatus is covered by the receiving resource pool of the receiving apparatus. Therefore, the bandwidth allocated with data channel (e.g., PSSCH)/control channel (e.g., PSCCH) transmitted to the receiving apparatus can be received and fully interpreted by the receiving apparatus.

In an embodiment, the receiving resource pool of the transmitting apparatus is, identical to the receiving resource pool of the receiving apparatus. This embodiment can be applied to the case that the transmitting apparatus transmits PSSCH based on the receiving resource pool of the transmitting apparatus and the receiving apparatus obtains and interprete the PSSCH based on the receiving apparatus is used as the common resource allocation reference In this way, the transmitting apparatus and the receiving apparatus share the same understanding regarding resource allocation based on their own receiving resource pool, which is identical to each other.

In an embodiment, in a case that the receiving apparatus is configured with multiple receiving resource pools, a superset of multiple receiving resource pools of the transmitting apparatus may be used as the common resource allocation reference.

In an embodiment, there is a resource pool, the resource pool is used by the transmitting apparatus for allocate resources for Physical Sidelink Shared Channel (PSSCH) and is used by a receiving apparatus to obtain the allocated resources, and wherein the resource pool is used as the common resource allocation reference. For either transmitting apparatus or receiving apparatus, such resource pool can be used for both transmission and reception (no differentiation on transmitting resource pool and receiving resource pool from each apparatus perspective).

Figure 6:
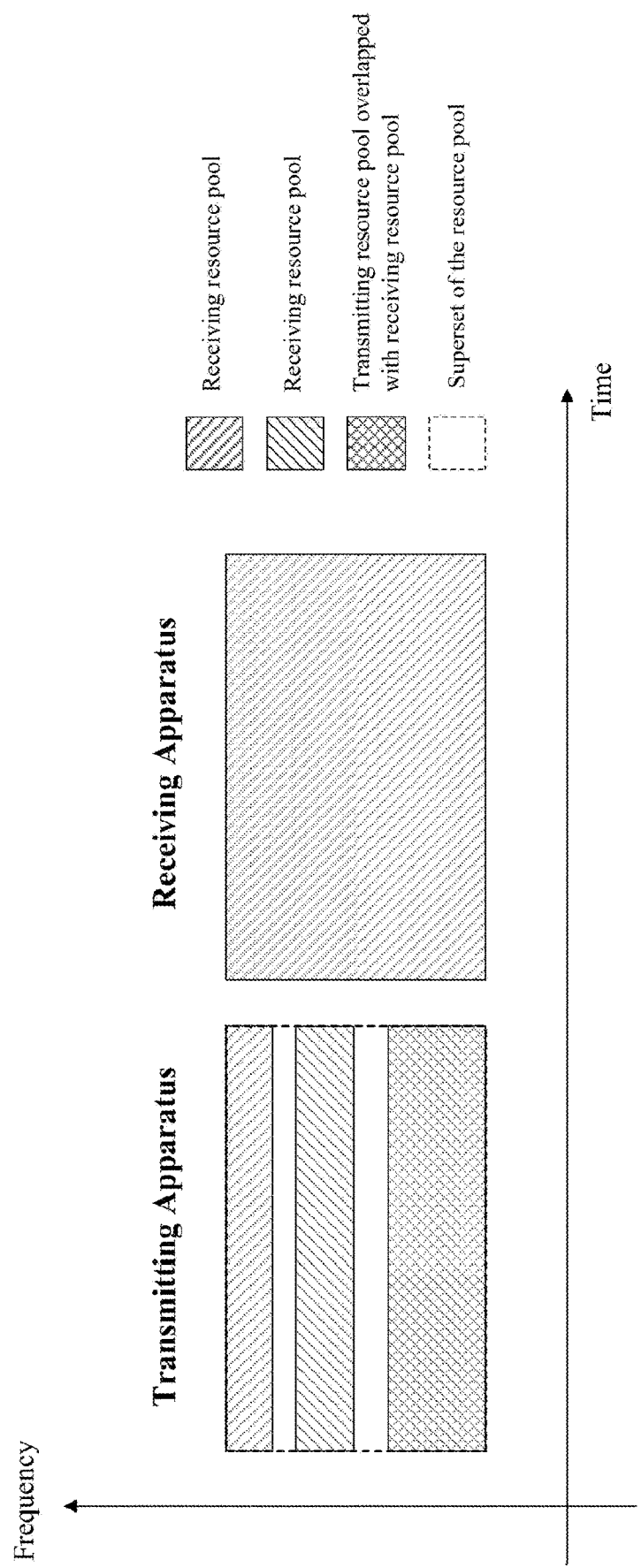
FIG. 6 schematically shows another exemplary scenario of resource allocation reference for a transmitting apparatus and a receiving apparatus according to an embodiment of the present disclosure.

FIG. 6 schematically shows another exemplary scenario of resource allocation reference for a transmitting apparatus and a receiving apparatus according to an embodiment of the present disclosure. In particular, in a case that the transmitting apparatus is configured with multiple receiving resource pools, a superset of multiple receiving resource pools of the transmitting apparatus is used as the common resource allocation reference, as shown in FIG. 6.

Here, the concept of "superset" represents a set comprises at least all the PRBs indicated by all receiving pools of the transmitting apparatus. Therefore, superset refers to at least two cases, a case that the starting PRB of the superset is the lowest PRB among the PRBs indicated by all receiving pools of the transmitting apparatus while the ending PRB of the superset is the highest PRB among the PRBs indicated by all receiving pools of the transmitting apparatus, and another case that the PRBs of the superset is a collection of PRBs indicated by all receiving pools of the transmitting/receiving apparatus.

In an embodiment, in a case that the transmitting apparatus is configured with multiple receiving resource pools, a superset of multiple receiving resource pools of the transmitting apparatus is used as the common resource allocation reference.

Similarly, the concept of "superset" represents a set comprises at least all the PRBs indicated by all receiving pools of the receiving apparatus. Therefore, superset refers to at least two cases, a case that the starting PRB of the superset is the lowest PRB among the PRBs indicated by all receiving pools of the transmitting apparatus while the ending PRB of the superset is the highest PRB among the PRBs indicated by all receiving pools of the receiving apparatus, and another case that the PRBs of the superset is a collection of PRBs indicated by all receiving pools of the receiving apparatus.

In an embodiment, in a case that the receiving apparatus is configured with multiple receiving resource pools, a superset of multiple receiving resource pools of the receiving apparatus is used as the common resource allocation reference.

In an embodiment, in a case that the receiving apparatus is configured with multiple receiving resource pools, a superset of multiple receiving resource pools of the receiving apparatus is used as the common resource allocation reference.

With the above configuration of the present disclosure, since the superset which is used as the common resource allocation reference could include at least all the PRBs indicated by all receiving pools of the transmitting apparatus, the transmitting apparatus and the receiving apparatus could have the same understanding about the resource allocation without changing the size or positions of PRBs of resource pools thereof.

In another embodiment, in a case of one or more transmitting resource pools and one or more receiving resource pools of the transmitting apparatus, a superset of the one or more transmitting resource pools and the one or more receiving resource pools of the transmitting apparatus may be used as the common resource allocation reference. Thus, the transmitting apparatus and the receiving apparatus could have the same understanding about the resource allocation without changing the size or positions of PRBs of resource pools thereof.

In another embodiment, in a case of one or more transmitting resource pools and one or more receiving resource pools of the receiving apparatus, a superset of one or more transmitting resource pools and one or more receiving resource pools of the receiving apparatus is used as the common resource allocation reference. Similarly, the transmitting apparatus and the receiving apparatus could have the same understanding about the resource allocation without changing the size or positions of PRBs of resource pools thereof.

Figure 7:
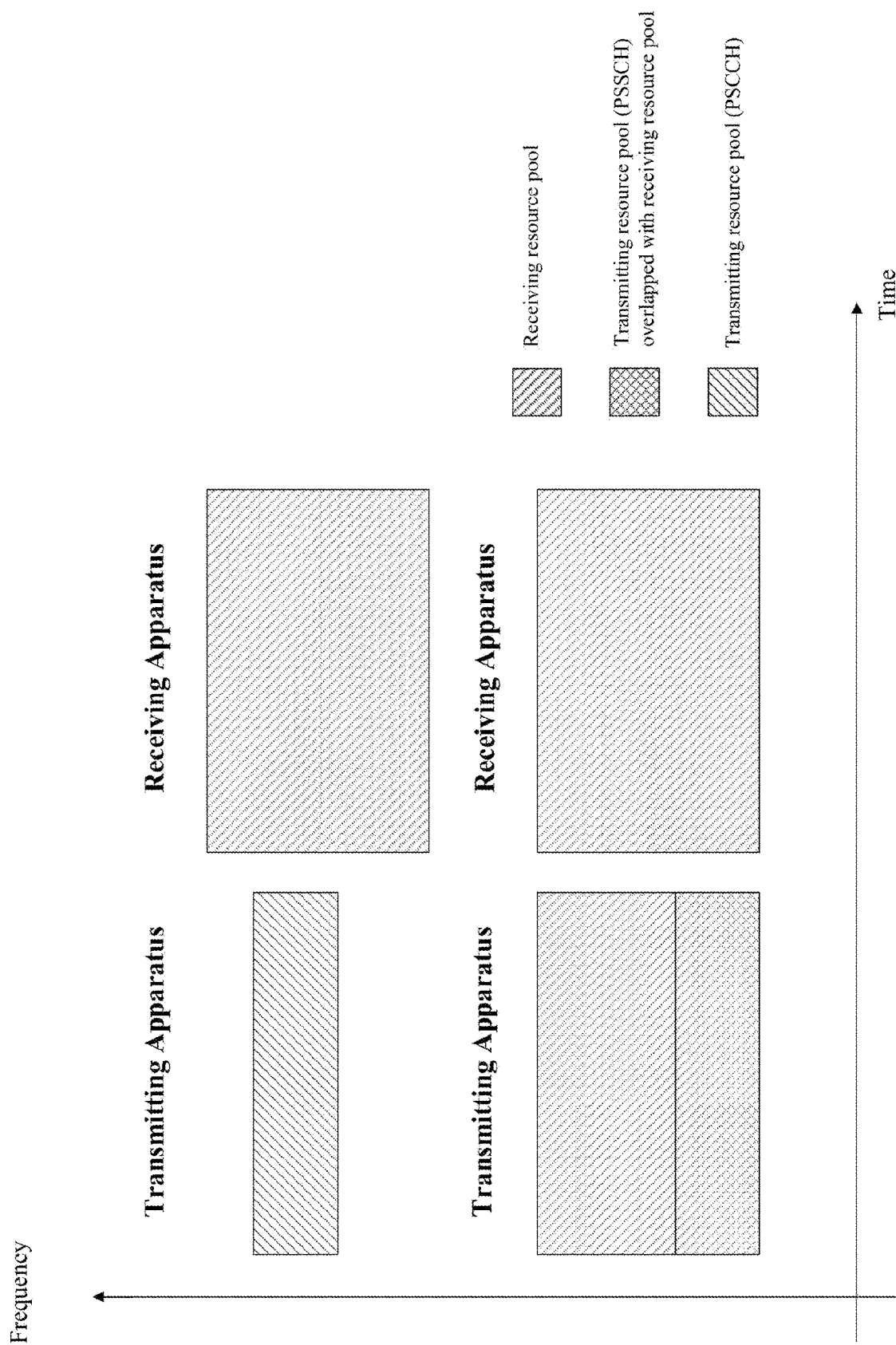
FIG. 7 schematically shows another exemplary scenario of resource allocation reference for a transmitting apparatus and a receiving apparatus according to an embodiment of the present disclosure.

FIG. 7 schematically shows another exemplary scenario of resource allocation reference for a transmitting apparatus and a receiving apparatus according to an embodiment of the present disclosure.

In particular, in this embodiment, in a case that a receiving resource pool for receiving PSCCH and PSSCH are separate, the receiving resource pool for receiving PSSCH of the transmitting apparatus may be used as the common resource allocation reference.

For example, when cross carrier scheduling apply, that is to say, the sidelink transmission occupies more than one carrier. As shown in FIG. 7, both the transmitting apparatus and the receiving apparatus have two carriers for PSCCH and PSSCH respectively and more than one cell are configured, and the PSSCH is transmitted in a scheduled carrier. In this case, the transmitting apparatus uses the receiving resource pool of the transmitting apparatus in the scheduled carrier for transmitting PSSCH as resource allocation reference for both the transmitting apparatus and the receiving apparatus, even if the PSCCH is transmitted in a scheduling carrier.

Although FIG. 7 shows a two-carrier case, the present disclosure is not limited thereto. Specifically, the present disclosure may also be applied to the case where multiple carriers are used. And in such circumstances, the transmitting apparatus uses the receiving resource pool of the transmitting apparatus in the schedule carrier for transmitting data channel (e.g., PSSCH) as resource allocation reference for both the transmitting apparatus and the receiving apparatus.

With the above configuration in the present disclosure, the UE using multiple carriers can also rely on the common resource allocation reference related to the PSSCH, not PSCCH, to eliminate the misunderstanding between the transmitting apparatus and the receiving apparatus when obtaining resource allocation for PSSCH.

Figure 8:
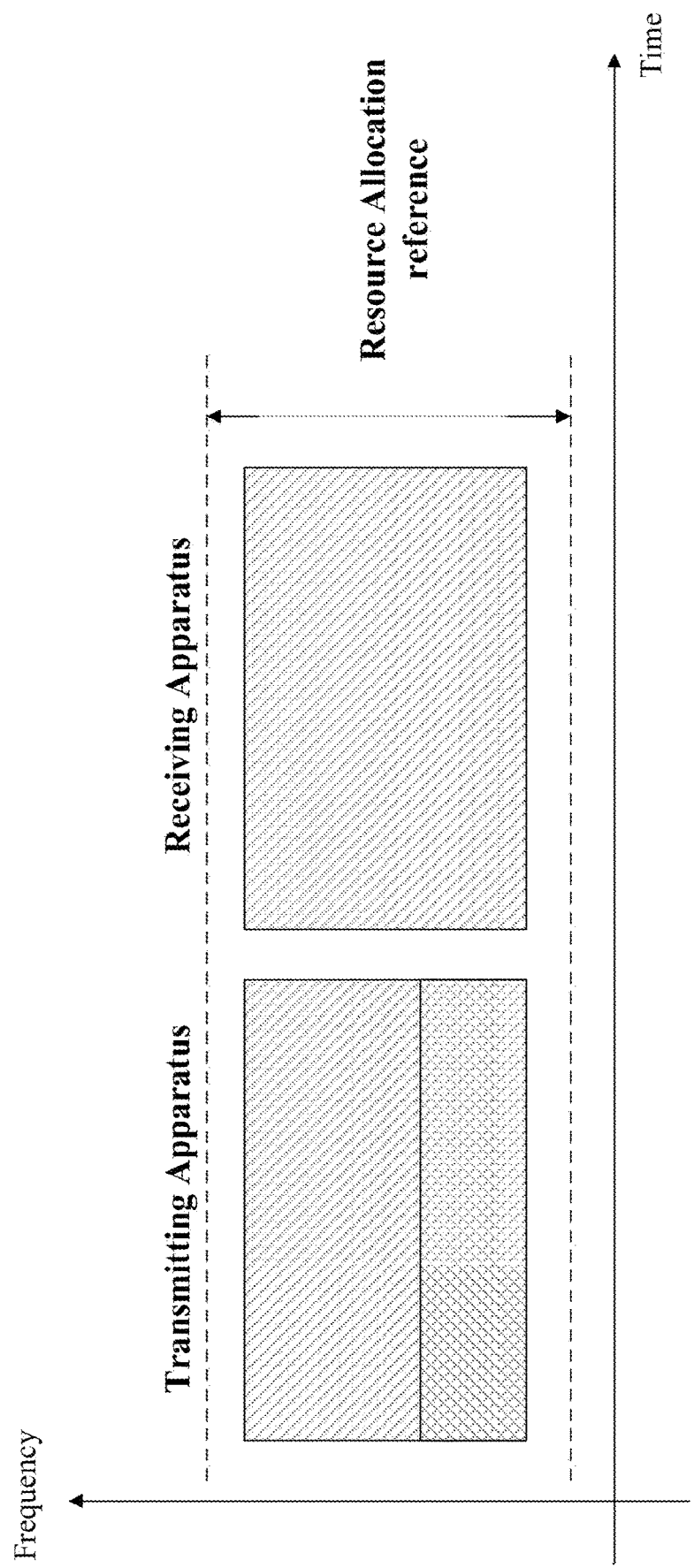
FIG. 8 schematically shows another exemplary scenario of resource allocation reference for a transmitting apparatus and a receiving apparatus according to an embodiment of the present disclosure.

FIG. 8 schematically shows another exemplary scenario of resource allocation reference for a transmitting apparatus and a receiving apparatus according to an embodiment of the present disclosure.

In this embodiment, the common resource allocation reference may be notified to the receiving apparatus via Sidelink Control Information (SCI) transmitted in PSCCH by the transmitting apparatus or the common resource reference is notified to the transmitting apparatus via sidelink Downlink Control Information (DCI) transmitted in PDCCH by a base station.

To be more specific, for example, in a case that the common resource allocation reference may be notified to the receiving apparatus via Sidelink Control Information (SCI) transmitted in PSCCH by the transmitting apparatus, at the transmitting apparatus side, assuming a receiving resource pool #1 has 10 PRBs, and a 10-bit bitmap is used to indicate resource allocation in SCI transmitted in PSCCH. "0100000000" indicates that the second PRB is allocated for data transmission (e.g., PSSCH). Such bitmap is exactly mapped to the receiving resource pool #1 (one bit refers to one PRB). At receiving apparatus side, when control channel (e.g., PSCCH) is received, the receiving apparatus recognizes the bitmap, based on the received PSCCH. In this way, after receiving PSSCH, the receiving apparatus can subsequently obtain the resource allocation for the received PSSCH correctly based on the same understanding with the transmitting apparatus.

As mentioned above, the base station allocates resources for Physical Downlink Shared Channel (PDSCH) based on the common resource allocation reference.

In the above embodiment, The resource allocation reference may primarily indicate a specific bandwidth for the resource allocated for data channel with, for example, a starting PRB and an ending PRB in a carrier are preconfigured or configured by Radio Resource Control (RRC), and indicate the common resource allocation reference; a starting PRB is specified as a lowest PRB index in a carrier and an ending PRB is pre-configured or configured by RRC, and both the lowest PRB index and the ending PRB indicate the common resource allocation reference; or a starting PRB is preconfigured or configured by Radio Resource Control (RRC) or specified as a lowest PRB index in a carrier, and a number of PRBs is configured, preconfigured or specified. The resource allocation may primarily indicate specific PRBs being allocated within the specific bandwidth indicated by the resource allocation reference in the other field.

With the above configuration of the present disclosure, the common resource allocation reference can be set up more accurately and flexibly, since the two fields accurately and flexibly indicating resource allocation reference and resource allocation are carried in the PSCCH updated on a transmission basis (i.e., every time when the transmitting apparatus transmits PSCCH to the receiving apparatus).

In another embodiment of the present disclosure, it is provided a transmitting apparatus, the common resource allocation reference is pre-configured, configured, specified or any combination thereof, i.e., the common resource allocation reference can be pre-configured in accordance with the standard, configured or specified by the base station, or any combination thereof. In particular, different from relying on their own receiving resource pool as common resource allocation reference as illustrated the embodiments disclosed above, a common resource allocation reference may also be (pre)configured, or specified for both the transmitting apparatus and the receiving apparatus.

To be more specific, For example, a common resource allocation reference may be configured/preconfigured by the base station/MME/the opposite communication apparatus or specified in accordance with 3GPP standard or by means of any combination thereof, in terms of the specific bandwidth in the carrier for data channel (e.g., PSSCH) and/or control channel (e.g., PSCCH).

With the above configuration in the present disclosure, due to the common resource allocation reference being issued in the flexible manner to both transmitting apparatus and receiving apparatus, in addition to providing the same understanding to the transmitting apparatus and receiving apparatus, the resource pool configuration is more flexible.

In this case, a specific bandwidth for the resource allocated for data channel is pre-configured, configured, specified or any combination thereof with, for example, a starting PRB and an ending PRB in a carrier are preconfigured or configured by Radio Resource Control (RRC), and indicate the common resource allocation reference; a starting PRB is specified as a lowest PRB index in a carrier and an ending PRB is pre-configured or configured by RRC, and both the lowest PRB index and the ending PRB indicate the common resource allocation reference; or a starting PRB is preconfigured or configured by Radio Resource Control (RRC) or specified as a lowest PRB index in a carrier, and a number of PRBs is configured, preconfigured or specified. The resource allocation may primarily indicate specific PRBs being allocated within the specific bandwidth indicated by the resource allocation reference in the other field.

With the above configuration of the present disclosure, due to the common resource allocation reference being issued in the flexible manner by the base station or in accordance with potential choices (pre-configurations) defined in the standard to both transmitting apparatus and receiving apparatus, in addition to providing the same understanding to the transmitting apparatus and receiving apparatus, the resource pool configuration is more flexible.

Figure 9:
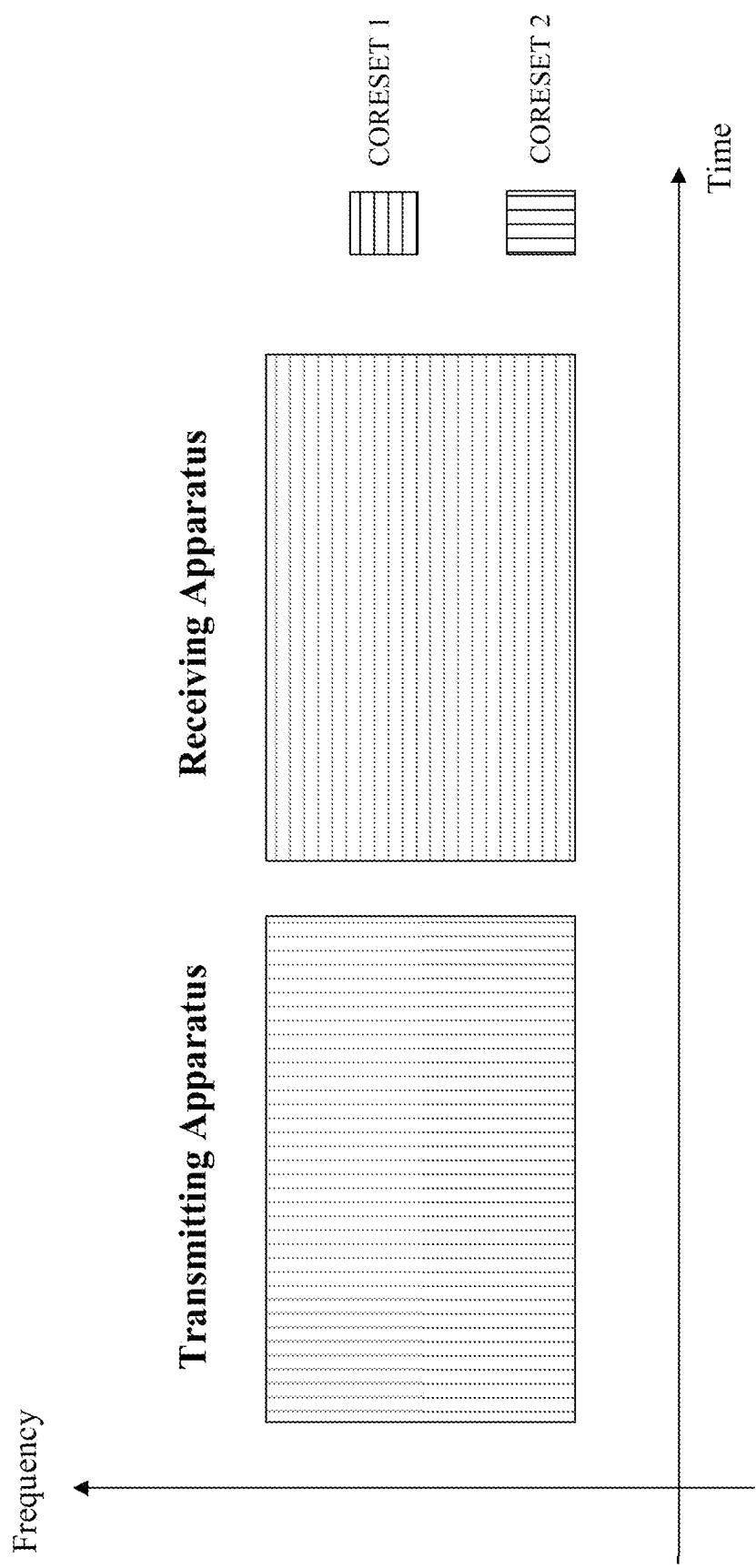
FIG. 9 schematically shows another exemplary scenario of resource allocation reference for a transmitting apparatus and a receiving apparatus according to an embodiment of the present disclosure.

FIG. 9 schematically shows another exemplary scenario of resource allocation reference for a transmitting apparatus and a receiving apparatus according to an embodiment of the present disclosure.

In this embodiment, a control resource set (CORESET) or a resource pool of PSCCH may be used as the common resource allocation reference for PSSCH.

Here, the CORESET is considered functioning in a similar manner as PSCCH resource pool and being used for resource allocation reference for PSSCH. Both the transmitting apparatus and the receiving apparatus acquire PSSCH bandwidth from the CORESET associated thereto, thereby the CORESET may, for example, be understood as a receiving resource pool for PSCCH.

With the above configuration of the present disclosure, the existing PSCCH configured with CORESET could also introduce the concept of the common resource reference to synchronize understanding between the transmitting apparatus and the receiving apparatus, without making much change to the whole system.

In an embodiment, there is a resource pool, and the common resource allocation reference is the resource pool.

Figure 10:
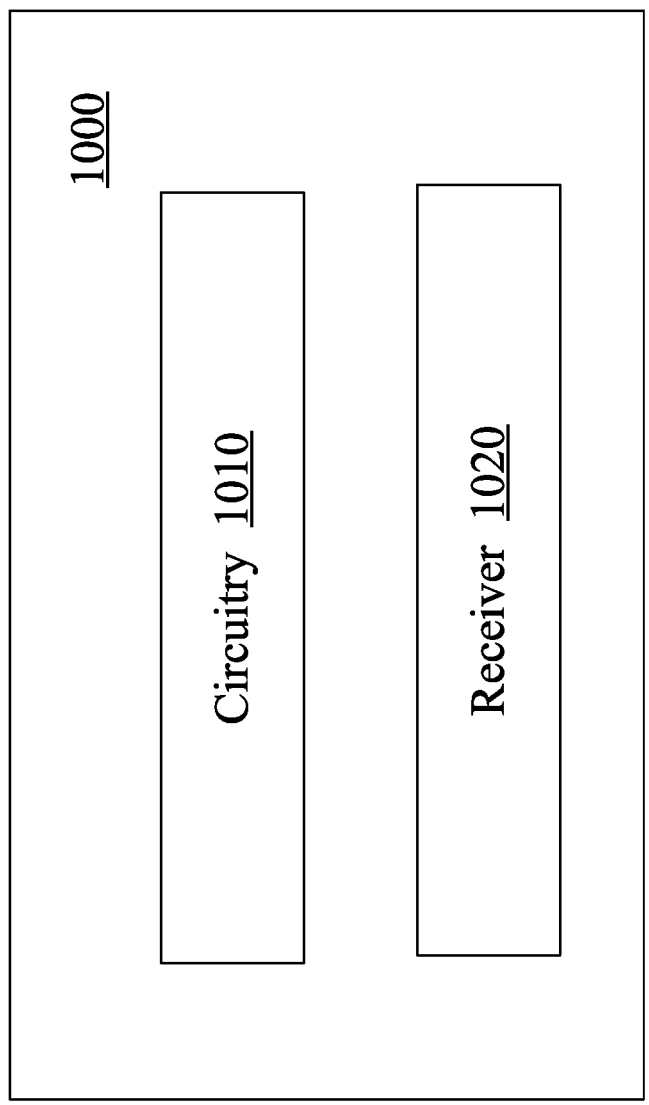
FIG. 10 illustrates a block diagram of an exemplary receiving apparatus according to an embodiment of the present disclosure.

FIG. 10 illustrates a block diagram of an exemplary receiving apparatus according to an embodiment of the present disclosure. The receiving apparatus 1000, comprising: a receiver 1020, operative to receive Physical Sidelink Shared Channel (PSSCH) on allocated resources and Physical Sidelink Control Channel (PSCCH); and circuitry 1010, operative to obtain the allocated resource for the PSSCH based on a common resource allocation reference which is used by a transmitting apparatus for transmitting PSSCH on the allocate resources.

Referring to FIG. 10, the common resource allocation reference used in the receiving apparatus can be (pre) configured or specified in the same manner with the common resource allocation reference in the transmitting apparatus. Alternatively, the common resource allocation reference in the receiving apparatus can be the receiving resource pool of the receiving apparatus in the case where the receiving resource pool of the receiving apparatus and the receiving resource pool of the transmitting apparatus are fully overlapped (i.e., identical) with each other.

Referring back to FIG. 3, the communication system 300 shown in FIG. 3 may function as a receiving apparatus 1000 as shown in FIG. 1. Specifically, the receiver 308 may correspond to the receiver 1020. The circuitry 1010 may include the second signal processor 309, the resource demultiplexer 310, the resource demapper 311, the demodulator 312, the decoder 313, the second circuitry 315, the resource demapper 311, the demodulator 312, and the decoder 313. Alternatively, one or more of these units may also be separated from the circuitry 1010 depending on specific requirements.

Therefore, the transmitting apparatus 400 of FIG. 4 and the receiving apparatus 1000 of FIG. 10 may be collectively called as a communication apparatus or combined into one communication apparatus, and such communication apparatus may comprise the circuitry (410, 1010), the transmitter (420) and the receiver (1020).

In an embodiment, a Bandwidth Part (BWP) is not used for the PSSCH and PSCCH transmission.

In an embodiment, a receiving resource pool of the transmitting apparatus or the receiving apparatus is used as the common resource allocation reference.

In an embodiment, in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, a transmitting resource pool of the transmitting apparatus is covered by the receiving resource pool of the receiving apparatus.

In an embodiment, the receiving resource pool of the transmitting apparatus is identical to the receiving resource pool of the receiving apparatus.

In an embodiment, in a case that the transmitting apparatus is configured with multiple receiving resource pools, a superset of multiple receiving resource pools of the transmitting apparatus is used as the common resource allocation reference.

In an embodiment, in a case that the receiving apparatus is configured with multiple receiving resource pools, a superset of multiple receiving resource pools of the receiving apparatus is used as the common resource allocation reference.

In an embodiment, a superset of one or more transmitting resource pools and one or more receiving resource pools of the transmitting apparatus is used as the common resource allocation reference.

In an embodiment, a superset of one or more transmitting resource pools and one or more receiving resource pools of the receiving apparatus is used as the common resource allocation reference.

In an embodiment, in a case that a receiving resource pool for receiving PSCCH and PSSCH are separate, the receiving resource pool for receiving PSSCH of the transmitting apparatus is used as the common resource allocation reference.

In an embodiment, the common resource allocation reference is notified to the receiving apparatus via Sidelink Control Information (SCI) transmitted in PSCCH by the transmitting apparatus, or the common resource reference is notified to the transmitting apparatus via sidelink Downlink Control Information (DCI) transmitted in PDCCH by a base station.

In an embodiment, the SCI indicates a field of the common resource reference and a field of resource allocation, wherein the field of resource allocation indicates allocated Physical Resource Blocks (PRB) within the common resource reference.

In an embodiment, the common resource allocation reference is pre-configured, configured, specified or any combination thereof.

In an embodiment, a starting PRB and an ending PRB in a carrier are preconfigured or configured by Radio Resource Control (RRC), and indicate the common resource allocation reference.

In an embodiment, a starting PRB is specified as a lowest PRB index in a carrier and an ending PRB is pre-configured or configured by RRC, and both the lowest PRB index and the ending PRB indicate the common resource allocation reference.

In an embodiment, a starting PRB is preconfigured or configured by Radio Resource Control (RRC) or specified as a lowest PRB index in a carrier, and a number of PRBs is configured, preconfigured or specified.

In an embodiment, in a case that multiple carriers or multiple cells are configured, the receiving resource pool of the transmitting apparatus in a scheduled carrier for transmitting PSSCH is used as the common resource allocation reference.

In an embodiment, a control resource set or a resource pool of PSCCH is used as the common resource allocation reference for PSSCH.

In an embodiment, the base station allocates resources for Physical Downlink Shared Channel (PDSCH) based on the common resource allocation reference.

In an embodiment, there is a resource pool, the resource pool is used by the transmitting apparatus for allocate resources for Physical Sidelink Shared Channel (PSSCH) and is used by a receiving apparatus to obtain the allocated resources, and wherein the resource pool is used as the common resource allocation reference. For either transmitting apparatus or receiving apparatus, such resource pool can be used for both transmission and reception (no differentiation on transmitting resource pool and receiving resource pool from each apparatus perspective).

Figure 11:
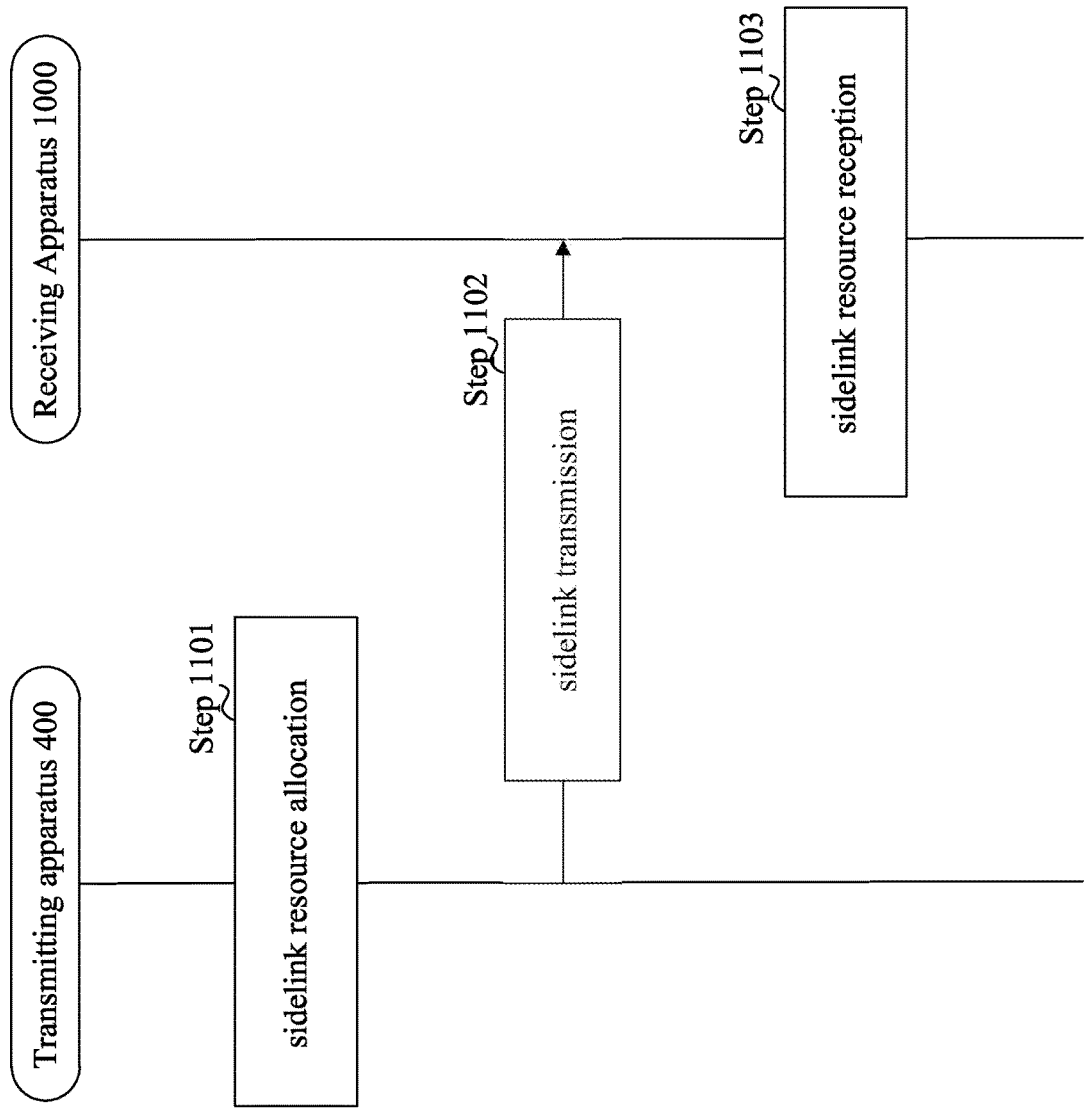
FIG. 11 schematically shows an example of a flowchart of communication between a transmitting apparatus and a receiving apparatus according to an embodiment of the present disclosure.

FIG. 11 schematically shows an example of a flowchart of communication method between a transmitting apparatus and a receiving apparatus according to an embodiment of the present disclosure. In particular, an example of a flowchart of communication method between a transmitting apparatus 400 and a receiving apparatus 1000 according to an embodiment of the present disclosure is shown. For example, the transmitting apparatus 400 may be the transmitting apparatus 400 as shown in FIG. 4 and the receiving apparatus 1000 may be the receiving apparatus 1000 as shown in FIG. 10.

As shown in FIG. 11, at a step 1101, the transmitting apparatus 400 allocates sidelink resource. For example, the resource allocated for PSSCH in a carrier may be preconfigured by the operator. For example, the operator may set a common resource reference and store it in the transmitting apparatus 400 in advance when designing the transmitting apparatus 400, and the transmitting apparatus 400 may allocate resources for Physical Sidelink Shared Channel (PSSCH) and indicate the resource allocation via Physical Sidelink Control Channel (PSCCH) based on a common resource allocation reference which is used by a receiving apparatus to obtain the allocated resources.

At a step 1102, the transmitting apparatus 400 may perform sidelink transmission to the receiving apparatus 1000. The connection may be established by implementing known or future developed method whose details are omitted herein (e.g., for unicast or groupcast communication), or the connection to totally not established (e.g., for broadcast communication).

At a step 1103, the receiving apparatus 1000 receives/obtains the allocated resource for the PSSCH based on a common resource allocation reference which is used by a transmitting apparatus for transmitting PSSCH on the allocate resources.

Figure 12:
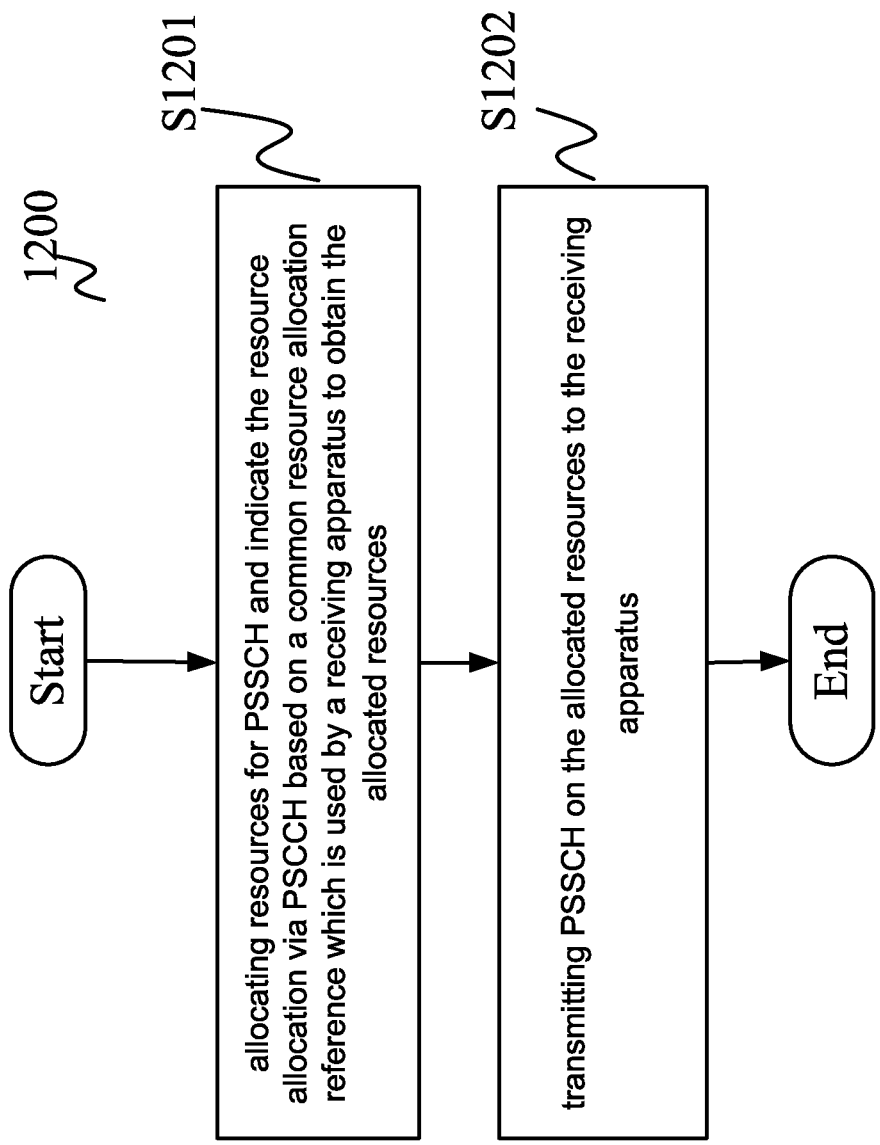
FIG. 12 illustrates a flowchart of a wireless communication method for a transmitting apparatus according to an embodiment of the present disclosure.

FIG. 12 illustrates a flowchart of a wireless communication method for a transmitting apparatus according to an embodiment of the present disclosure.

As shown in FIG. 12, the wireless communication method 1200 performed by a transmitting apparatus starts at a step S1201 of a circuitry allocating resources for Physical Sidelink Shared Channel (PSSCH) and indicating the resource allocation via Physical Sidelink Control Channel (PSCCH) based on a common resource allocation reference which is used by a receiving apparatus to obtain the allocated resources. Then, at a step S1202, the transmitter transmits PSSCH on the allocated resources to the receiving apparatus. For example, the transmitting apparatus may be the transmitting apparatus 400 as shown in FIG. 4 and the circuitry and the transmitter may be the circuitry 410 and the transmitter 420 as shown in FIG. 4, respectively.

With the wireless communication method 1200, the complexity of the transmitter design may be reduced and the system performance may be improved. In addition, a more accurate resource location can also be achieved in the case that even a BWP is used/supported, thereby power saving is further improved.

In an embodiment, a Bandwidth Part (BWP) is not used for the PSSCH and PSCCH transmission.

In an embodiment, a receiving resource pool of the transmitting apparatus or the receiving apparatus is used as the common resource allocation reference.

In an embodiment, in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, a transmitting resource pool of the transmitting apparatus is covered by the receiving resource pool of the receiving apparatus.

In an embodiment, the receiving resource pool of the transmitting apparatus is identical to the receiving resource pool of the receiving apparatus.

In an embodiment, in a case that the transmitting apparatus is configured with multiple receiving resource pools, a superset of multiple receiving resource pools of the transmitting apparatus is used as the common resource allocation reference.

In an embodiment, in a case that the receiving apparatus is configured with multiple receiving resource pools, a superset of multiple receiving resource pools of the receiving apparatus is used as the common resource allocation reference.

In an embodiment, a superset of one or more transmitting resource pools and one or more receiving resource pools of the transmitting apparatus is used as the common resource allocation reference.

In an embodiment, a superset of one or more transmitting resource pools and one or more receiving resource pools of the receiving apparatus is used as the common resource allocation reference.

In an embodiment, in a case that a receiving resource pool for receiving PSCCH and PSSCH are separate, the receiving resource pool for receiving PSSCH of the transmitting apparatus is used as the common resource allocation reference.

In an embodiment, the common resource allocation reference is notified to the receiving apparatus via Sidelink Control Information (SCI) transmitted in PSCCH by the transmitting apparatus.

In an embodiment, the SCI indicates a field of the common resource reference and a field of resource allocation, wherein the field of resource allocation indicates allocated Physical Resource Blocks (PRB) within the common resource reference.

In an embodiment, the common resource allocation reference is pre-configured, configured, specified or any combination thereof.

In an embodiment, a starting PRB and an ending PRB in a carrier are preconfigured or configured by Radio Resource Control (RRC), and indicate the common resource allocation reference.

In an embodiment, a starting PRB is specified as a lowest PRB index in a carrier and an ending PRB is pre-configured or configured by RRC, and both the lowest PRB index and the ending PRB indicate the common resource allocation reference.

In an embodiment, a starting PRB is preconfigured or configured by Radio Resource Control (RRC) or specified as a lowest PRB index in a carrier, and a number of PRBs is configured, preconfigured or specified.

In an embodiment, in a case that multiple carriers or multiple cells are configured, the receiving resource pool of the transmitting apparatus in a scheduled carrier for transmitting PSSCH is used as the common resource allocation reference.

In an embodiment, a control resource set or a resource pool of PSCCH is used as the common resource allocation reference for PSSCH.

In an embodiment, the base station allocates resources for Physical Downlink Shared Channel (PDSCH) based on the common resource allocation reference.

In an embodiment, the resource pool is used by the transmitting apparatus for allocate resources for Physical Sidelink Shared Channel (PSSCH) and is used by a receiving apparatus to obtain the allocated resources, and wherein the resource pool is used as the common resource allocation reference.

Figure 13:
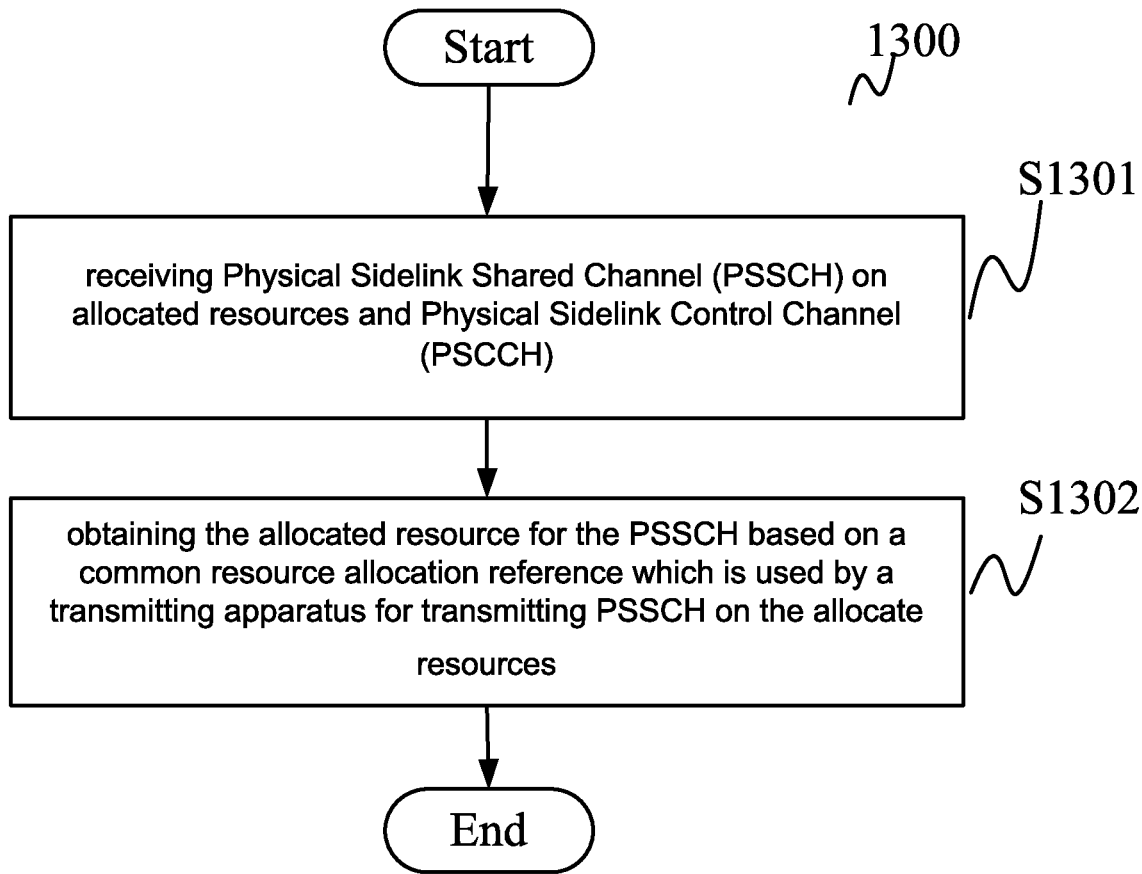
FIG. 13 illustrates a flowchart of a wireless communication method for a receiving apparatus according to an embodiment of the present disclosure.

As shown in FIG. 13, the wireless communication method 1300 performed by a receiving apparatus starts at a step S1301 of a receiver receiving Physical Sidelink Shared Channel (PSSCH) on allocated resources and Physical Sidelink Control Channel (PSCCH). Then, at a step S1302, the circuitry obtains the allocated resource for the PSSCH based on a common resource allocation reference which is used by a transmitting apparatus for transmitting PSSCH on the allocate resources. For example, the receiving apparatus may be the receiving apparatus 1000 as shown in FIG. 10 and the circuitry and the transmitter may be the circuitry 1010 and the transmitter 1020 as shown in FIG. 10, respectively.

With the wireless communication method 1300, the complexity of the receiver design may be reduced and the system performance may be improved. In addition, a more accurate resource location can also be achieved in the case that even a BWP is used/supported, thereby power saving is further improved.

In an embodiment, a Bandwidth Part (BWP) is not used for the PSSCH and PSCCH transmission.

In an embodiment, a receiving resource pool of the transmitting apparatus or the receiving apparatus is used as the common resource allocation reference.

In an embodiment, in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, a transmitting resource pool of the transmitting apparatus is covered by the receiving resource pool of the receiving apparatus.

In an embodiment, the receiving resource pool of the transmitting apparatus is identical to the receiving resource pool of the receiving apparatus.

In an embodiment, in a case that the transmitting apparatus is configured with multiple receiving resource pools, a superset of multiple receiving resource pools of the transmitting apparatus is used as the common resource allocation reference.

In an embodiment, in a case that the receiving apparatus is configured with multiple receiving resource pools, a superset of multiple receiving resource pools of the receiving apparatus is used as the common resource allocation reference.

In an embodiment, a superset of one or more transmitting resource pools and one or more receiving resource pools of the transmitting apparatus is used as the common resource allocation reference.

In an embodiment, a superset of one or more transmitting resource pools and one or more receiving resource pools of the receiving apparatus is used as the common resource allocation reference.

In an embodiment, in a case that a receiving resource pool for receiving PSCCH and PSSCH are separate, the receiving resource pool for receiving PSSCH of the transmitting apparatus is used as the common resource allocation reference.

In an embodiment, the common resource allocation reference is notified to the receiving apparatus via Sidelink Control Information (SCI) transmitted in PSCCH by the transmitting apparatus, or the common resource reference is notified to the transmitting apparatus via sidelink Downlink Control Information (DCI) transmitted in PDCCH by a base station.

In an embodiment, the base station allocates resources for Physical Downlink Shared Channel (PDSCH) based on the common resource allocation reference.

In an embodiment, the SCI indicates a field of the common resource reference and a field of resource allocation, wherein the field of resource allocation indicates allocated Physical Resource Blocks (PRB) within the common resource reference.

In an embodiment, the common resource allocation reference is pre-configured, configured, specified or any combination thereof.

In an embodiment, a starting PRB and an ending PRB in a carrier are preconfigured or configured by Radio Resource Control (RRC), and indicate the common resource allocation reference.

In an embodiment, a starting PRB is specified as a lowest PRB index in a carrier and an ending PRB is pre-configured or configured by RRC, and both the lowest PRB index and the ending PRB indicate the common resource allocation reference.

In an embodiment, a starting PRB is preconfigured or configured by Radio Resource Control (RRC) or specified as a lowest PRB index in a carrier, and a number of PRBs is configured, preconfigured or specified.

In an embodiment, in a case that multiple carriers or multiple cells are configured, the receiving resource pool of the transmitting apparatus in a scheduled carrier for transmitting PSSCH is used as the common resource allocation reference.

In an embodiment, a control resource set or a resource pool of PSCCH is used as the common resource allocation reference for PSSCH.

In an embodiment, there is a resource pool, the resource pool is used by the transmitting apparatus for allocate resources for Physical Sidelink Shared Channel (PSSCH) and is used by a receiving apparatus to obtain the allocated resources, and wherein the resource pool is used as the common resource allocation reference. For either transmitting apparatus or receiving apparatus, such resource pool can be used for both transmission and reception (no differentiation on transmitting resource pool and receiving resource pool from each apparatus perspective).

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Embodiments of the present disclosure can at least provide the following subject matters:

(1). A transmitting apparatus, comprising:
circuitry, operative to allocate resources for Physical Sidelink Shared Channel (PSSCH) based on a common resource allocation reference and indicate the resource allocation via Physical Sidelink Control Channel (PSCCH) which is used by a receiving apparatus to obtain the allocated resources; and
a transmitter, operative to transmit PSCCH and associated PSSCH on the allocated resources to the receiving apparatus.

(2). The transmitting apparatus according to (1), wherein
wherein a Bandwidth Part (BWP) is not used for the PSSCH and PSCCH transmission.

(3). The transmitting apparatus according to (1), wherein
wherein a receiving resource pool of the transmitting apparatus or the receiving apparatus is used as the common resource allocation reference.

(4). The transmitting apparatus according to (3), wherein
in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, a transmitting resource pool of the transmitting apparatus is covered by the receiving resource pool of the receiving apparatus.

(5). The transmitting apparatus according to (1), wherein
the receiving resource pool of the transmitting apparatus is identical to the receiving resource pool of the receiving apparatus.

(6). The transmitting apparatus according to (1), wherein
in a case that the transmitting apparatus is configured with multiple receiving resource pools, a superset of multiple receiving resource pools of the transmitting apparatus is used as the common resource allocation reference.

(7). The transmitting apparatus according to (1), wherein
in a case that the receiving apparatus is configured with multiple receiving resource pools, a superset of multiple receiving resource pools of the receiving apparatus is used as the common resource allocation reference.

(8). The transmitting apparatus according to (1), wherein
a superset of one or more transmitting resource pools and one or more receiving resource pools of the transmitting apparatus is used as the common resource allocation reference.

(9). The transmitting apparatus according to (1), wherein
a superset of one or more transmitting resource pools and one or more receiving resource pools of the receiving apparatus is used as the common resource allocation reference.

(10). The transmitting apparatus according to (1), wherein
in a case that a receiving resource pool for receiving PSCCH and PSSCH are separate, the receiving resource pool for receiving PSSCH of the transmitting apparatus is used as the common resource allocation reference.

(11). The transmitting apparatus according to (1), wherein
the common resource allocation reference is notified to the receiving apparatus via Sidelink Control Information (SCI) transmitted in PSCCH by the transmitting apparatus, or
the common resource reference is notified to the transmitting apparatus via sidelink Downlink Control Information (DCI) transmitted in PDCCH by a base station.

(12). The transmitting apparatus according to (11), wherein the SCI indicates a field of the common resource reference and a field of resource allocation, wherein the field of resource allocation indicates allocated Physical Resource Blocks (PRB) within the common resource reference.

(13). The transmitting apparatus according to (1), wherein the common resource allocation reference is pre-configured, configured, specified or any combination thereof.

(14). The transmitting apparatus according to (11), wherein a starting PRB and an ending PRB in a carrier are preconfigured or configured by Radio Resource Control (RRC), and indicate the common resource allocation reference.

(15). The transmitting apparatus according to (11), wherein a starting PRB is specified as a lowest PRB index in a carrier and an ending PRB is pre-configured or configured by RRC, and both the lowest PRB index and the ending PRB indicate the common resource allocation reference.

(16). The transmitting apparatus according to (11), wherein a starting PRB is preconfigured or configured by Radio Resource Control (RRC) or specified as a lowest PRB index in a carrier, and a number of PRBs is configured, preconfigured or specified.

(17). The transmitting apparatus according to (1), wherein
in a case that multiple carriers or multiple cells are configured, the receiving resource pool of the transmitting apparatus in a scheduled carrier for transmitting PSSCH is used as the common resource allocation reference.

(18). The transmitting apparatus according to (1), wherein
a control resource set or a resource pool of PSCCH is used as the common resource allocation reference for PSSCH.

(19). The transmitting apparatus according to (1), wherein the base station allocates resources for Physical Downlink Shared Channel (PDSCH) based on the common resource allocation reference.

(20). A receiving apparatus, comprising:
a receiver, operative to receive Physical Sidelink Shared Channel (PSSCH) on allocated resources and Physical Sidelink Control Channel (PSCCH); and circuitry, operative to obtain the allocated resource for the PSSCH based on a common resource allocation reference which is used by a transmitting apparatus for transmitting PSSCH on the allocate resources.

(21). The receiving apparatus according to (20), wherein
wherein a Bandwidth Part (BWP) is not used for the PSSCH and PSCCH transmission.

(22). The receiving apparatus according to (20), wherein
wherein a receiving resource pool of the transmitting apparatus or the receiving apparatus is used as the common resource allocation reference.

(23). The receiving apparatus according to (22), wherein
in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, a transmitting resource pool of the transmitting apparatus is covered by the receiving resource pool of the receiving apparatus.

(24). The transmitting apparatus according to (20), wherein the receiving resource pool of the transmitting apparatus is identical to the receiving resource pool of the receiving apparatus.

(25). The receiving apparatus according to (20), wherein
in a case that the transmitting apparatus is configured with multiple receiving resource pools, a superset of multiple receiving resource pools of the transmitting apparatus is used as the common resource allocation reference.

(26). The transmitting apparatus according to (20), wherein
in a case that the receiving apparatus is configured with multiple receiving resource pools, a superset of multiple receiving resource pools of the receiving apparatus is used as the common resource allocation reference.

(27). The receiving apparatus according to (20), wherein
a superset of one or more transmitting resource pools and one or more receiving resource pools of the transmitting apparatus is used as the common resource allocation reference.

(28). The transmitting apparatus according to (20), wherein
a superset of one or more transmitting resource pools and one or more receiving resource pools of the receiving apparatus is used as the common resource allocation reference.

(29). The receiving apparatus according to (20), wherein
in a case that a receiving resource pool for receiving PSCCH and PSSCH are separate, the receiving resource pool for receiving PSSCH of the transmitting apparatus is used as the common resource allocation reference.

(30). The receiving apparatus according to (20), wherein
the common resource allocation reference is notified to the receiving apparatus via Sidelink Control Information (SCI) transmitted in PSCCH by the transmitting apparatus, or
the common resource reference is notified to the transmitting apparatus via sidelink Downlink Control Information (DCI) transmitted in PDCCH by a base station.

(31). The receiving apparatus according to (30), wherein the SCI indicates a field of the common resource reference and a field of resource allocation, wherein the field of resource allocation indicates allocated Physical Resource Blocks (PRB) within the common resource reference.

(32). The receiving apparatus according to (20), wherein the common resource allocation reference is pre-configured, configured, specified or any combination thereof.

(33). The receiving apparatus according to (30), wherein a starting PRB and an ending PRB in a carrier are preconfigured or configured by Radio Resource Control (RRC), and indicate the common resource allocation reference.

(34). The receiving apparatus according to (30), wherein a starting PRB is specified as a lowest PRB index in a carrier and an ending PRB is pre-configured or configured by RRC, and both the lowest PRB index and the ending PRB indicate the common resource allocation reference.

(35). The receiving apparatus according to (30), wherein a starting PRB is preconfigured or configured by Radio Resource Control (RRC) or specified as a lowest PRB index in a carrier, and a number of PRBs is configured, preconfigured or specified.

(36). The receiving apparatus according to (20), wherein
in a case that multiple carriers or multiple cells are configured, the receiving resource pool of the transmitting apparatus in a scheduled carrier for transmitting PSSCH is used as the common resource allocation reference.

(37). The receiving apparatus according to (20), wherein
a control resource set or a resource pool of PSCCH is used as the common resource allocation reference for PSSCH.

(38). The transmitting apparatus according to (20), wherein the base station allocates resources for Physical Downlink Shared Channel (PDSCH) based on the common resource allocation reference.

(39). A wireless communication method for a transmitting apparatus, comprising:
allocating resources for Physical Sidelink Shared Channel (PSSCH) and indicate the resource allocation via Physical Sidelink Control Channel (PSCCH) based on a common resource allocation reference which is used by a receiving apparatus to obtain the allocated resources; and
transmitting PSSCH on the allocated resources to the receiving apparatus.

(40). The wireless communication method to (39), wherein
wherein a Bandwidth Part (BWP) is not used for the PSSCH and PSCCH transmission.

(41). The wireless communication method according to (39), wherein
wherein a receiving resource pool of the transmitting apparatus or the receiving apparatus is used as the common resource allocation reference.

(42). The wireless communication method according to (41), wherein
in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, a transmitting resource pool of the transmitting apparatus is covered by the receiving resource pool of the receiving apparatus.

(43). The wireless communication method according to (39), wherein the receiving resource pool of the transmitting apparatus is identical to the receiving resource pool of the receiving apparatus.

(44). The wireless communication method according to (28), wherein
in a case that the transmitting apparatus is configured with multiple receiving resource pools, a superset of multiple receiving resource pools of the transmitting apparatus is used as the common resource allocation reference.

(45). The wireless communication method according to (39), wherein
in a case that the receiving apparatus is configured with multiple receiving resource pools, a superset of multiple receiving resource pools of the receiving apparatus is used as the common resource allocation reference.

(46). The wireless communication method according to (39), wherein
a superset of one or more transmitting resource pools and one or more receiving resource pools of the transmitting apparatus is used as the common resource allocation reference.

(47). The wireless communication method according to (39), wherein
a superset of one or more transmitting resource pools and one or more receiving resource pools of the receiving apparatus is used as the common resource allocation reference.

(48). The wireless communication method according to (39), wherein
in a case that a receiving resource pool for receiving PSCCH and PSSCH are separate, the receiving resource pool for receiving PSSCH of the transmitting apparatus is used as the common resource allocation reference.

(49). The wireless communication method according to (39), wherein the common resource allocation reference is notified to the receiving apparatus via Sidelink Control Information (SCI) transmitted in PSCCH by the transmitting apparatus, or
the common resource reference is notified to the transmitting apparatus via sidelink Downlink Control Information (DCI) transmitted in PDCCH by a base station.

(50). The wireless communication method according to (49), wherein the SCI indicates a field of the common resource reference and a field of resource allocation,
wherein the field of resource allocation indicates allocated Physical Resource Blocks (PRB) within the common resource reference.

(51). The wireless communication method according to (39), wherein the common resource allocation reference is pre-configured, configured, specified or any combination thereof.

(52). The wireless communication method according to (49), wherein a starting PRB and an ending PRB in a carrier are preconfigured or configured by Radio Resource Control (RRC), and indicate the common resource allocation reference.

(53). The wireless communication method according to (49), wherein a starting PRB is specified as a lowest PRB index in a carrier and an ending PRB is pre-configured or configured by RRC, and both the lowest PRB index and the ending PRB indicate the common resource allocation reference.

(54). The wireless communication method according to (49), wherein a starting PRB is preconfigured or configured by Radio Resource Control (RRC) or specified as a lowest PRB index in a carrier, and a number of PRBs is configured, preconfigured or specified.

(55). The wireless communication method according to (39), wherein
in a case that multiple carriers or multiple cells are configured, the receiving resource pool of the transmitting apparatus in a scheduled carrier for transmitting PSSCH is used as the common resource allocation reference.

(56). The wireless communication method according to (39), wherein
a control resource set or a resource pool of PSCCH is used as the common resource allocation reference for PSSCH.

(57). The wireless communication method according to (39), wherein the base station allocates resources for Physical Downlink Shared Channel (PDSCH) based on the common resource allocation reference.

(58). A wireless communication method for a receiving apparatus, comprising:
receiving Physical Sidelink Shared Channel (PSSCH) on allocated resources and Physical Sidelink Control Channel (PSCCH); and
obtaining the allocated resource for the PSSCH based on a common resource allocation reference which is used by a transmitting apparatus for transmitting PSSCH on the allocate resources.

(59). The wireless communication method to (58), wherein
wherein a Bandwidth Part (BWP) is not used for the PSSCH and PSCCH transmission.

(60). The wireless communication method according to (58), wherein
wherein a receiving resource pool of the transmitting apparatus or the receiving apparatus is used as the common resource allocation reference.

(61). The wireless communication method according to (58), wherein in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, a transmitting resource pool of the transmitting apparatus is covered by the receiving resource pool of the receiving apparatus.

(62). The wireless communication method according to (58), wherein the receiving resource pool of the transmitting apparatus is identical to the receiving resource pool of the receiving apparatus.

(63). The wireless communication method according to (58), wherein in a case that the transmitting apparatus is configured with multiple receiving resource pools, a superset of multiple receiving resource pools of the transmitting apparatus is used as the common resource allocation reference.

(64). The wireless communication method according to (58), wherein in a case that the receiving apparatus is configured with multiple receiving resource pools, a superset of multiple receiving resource pools of the receiving apparatus is used as the common resource allocation reference.

(65). The wireless communication method according to (58), wherein a superset of one or more transmitting resource pools and one or more receiving resource pools of the transmitting apparatus is used as the common resource allocation reference.

(66). The wireless communication method according to (58), wherein a superset of one or more transmitting resource pools and one or more receiving resource pools of the receiving apparatus is used as the common resource allocation reference.

(67). The wireless communication method according to (58), wherein in a case that a receiving resource pool for receiving PSCCH and PSSCH are separate, the receiving resource pool for receiving PSSCH of the transmitting apparatus is used as the common resource allocation reference.

(68). The wireless communication method according to (58), wherein the common resource allocation reference is notified to the receiving apparatus via Sidelink Control Information (SCI) transmitted in PSCCH by the transmitting apparatus, or the common resource reference is notified to the transmitting apparatus via sidelink Downlink Control Information (DCI) transmitted in PDCCH by a base station.

(69). The wireless communication method according to (68), wherein the SCI indicates a field of the common resource reference and a field of resource allocation, wherein the field of resource allocation indicates allocated Physical Resource Blocks (PRB) within the common resource reference.

(70). The wireless communication method according to (58), wherein the common resource allocation reference is pre-configured, configured, specified or any combination thereof.

(71). The wireless communication method according to (68), wherein a starting PRB and an ending PRB in a carrier are preconfigured or configured by Radio Resource Control (RRC), and indicate the common resource allocation reference.

(72). The wireless communication method according to (68), wherein a starting PRB is specified as a lowest PRB index in a carrier and an ending PRB is pre-configured or configured by RRC, and both the lowest PRB index and the ending PRB indicate the common resource allocation reference.

(73). The wireless communication method according to (68), wherein a starting PRB is preconfigured or configured by Radio Resource Control (RRC) or specified as a lowest PRB index in a carrier, and a number of PRBs is configured, preconfigured or specified.

(74). The wireless communication method according to (58), wherein in a case that multiple carriers or multiple cells are configured, the receiving resource pool of the transmitting apparatus in a scheduled carrier for transmitting PSSCH is used as the common resource allocation reference.

(75). The wireless communication method according to (58), wherein a control resource set or a resource pool of PSCCH is used as the common resource allocation reference for PSSCH.

(76). The wireless communication method according to (58), wherein the base station allocates resources for Physical Downlink Shared Channel (PDSCH) based on the common resource allocation reference.

(77). The wireless communication method according to (58) or (39), wherein there is a resource pool, the resource pool is used by the transmitting apparatus for allocate resources for Physical Sidelink Shared Channel (PSSCH) and is used by a receiving apparatus to obtain the allocated resources, and wherein the resource pool is used as the common resource allocation reference.

(78). The transmitting apparatus according to (1), wherein there is a resource pool, the resource pool is used by the transmitting apparatus for allocate resources for Physical Sidelink Shared Channel (PSSCH) and is used by a receiving apparatus to obtain the allocated resources, and wherein the resource pool is used as the common resource allocation reference. For either transmitting apparatus or receiving apparatus, such resource pool can be used for both transmission and reception.

(79). The receiving apparatus according to (20), wherein there is a resource pool, the resource pool is used by the transmitting apparatus for allocate resources for Physical Sidelink Shared Channel (PSSCH) and is used by a receiving apparatus to obtain the allocated resources, and wherein the resource pool is used as the common resource allocation reference. For either transmitting apparatus or receiving apparatus, such resource pool can be used for both transmission and reception.

The invention claimed is:
1. A transmitting apparatus, comprising:
circuitry, operative to allocate resources for a Physical Sidelink Shared Channel (PSSCH) based on a common resource allocation reference and indicate the allocated resources via a Physical Sidelink Control Channel (PSCCH) which is used by a receiving apparatus to obtain the allocated resources; and
a transmitter, operative to transmit the PSCCH and the PSSCH on the allocated resources to the receiving apparatus,
wherein a resource pool is selected from one of a receiving resource pool of the transmitting apparatus or a receiving resource pool of the receiving apparatus and is used as the common resource allocation reference.

2. The transmitting apparatus according to claim 1, wherein a Bandwidth Part (BWP) is not used for transmitting the PSSCH and the PSCCH.

3. The transmitting apparatus according to claim 1, wherein in the case that the receiving resource pool of the transmitting apparatus is used as the common resource allocation reference, a transmitting resource pool of the transmitting apparatus is covered by the receiving resource pool of the transmitting apparatus; and in the case that the receiving resource pool of the receiving apparatus is used as the common resource allocation reference, the transmitting resource pool of the transmitting apparatus is covered by the receiving resource pool of the receiving apparatus.

4. The transmitting apparatus according to claim 3, wherein the receiving resource pool of the transmitting apparatus is identical to the receiving resource pool of the receiving apparatus.

5. The transmitting apparatus according to claim 1, wherein in a case that the transmitting apparatus is configured with multiple receiving resource pools, a superset of multiple receiving resource pools of the transmitting apparatus is used as the common resource allocation reference.

6. The transmitting apparatus according to claim 1, wherein in a case that the receiving apparatus is configured with multiple receiving resource pools, a superset of multiple receiving resource pools of the receiving apparatus is used as the common resource allocation reference.

7. The transmitting apparatus according to claim 1, wherein a superset of one or more transmitting resource pools and one or more receiving resource pools of the transmitting apparatus is used as the common resource allocation reference.

8. The transmitting apparatus according to claim 1, wherein a superset of one or more transmitting resource pools and one or more receiving resource pools of the receiving apparatus is used as the common resource allocation reference.

9. The transmitting apparatus according to claim 1, wherein the receiving apparatus is notified of the common resource allocation reference via Sidelink Control Information (SCI) transmitted in the PSCCH by the transmitting apparatus, or the transmitting apparatus is notified of the common resource allocation reference via sidelink Downlink Control Information (DCI) transmitted in a PDCCH by a base station.

10. The transmitting apparatus according to claim 9, wherein the SCI indicates a field of the common resource allocation reference and a field of resource allocation, wherein the field of resource allocation indicates allocated Physical Resource Blocks (PRB) within the common resource allocation reference.

11. The transmitting apparatus according to claim 9, wherein the base station allocates resources for a Physical Downlink Shared Channel (PDSCH) based on the common resource allocation reference.

12. The transmitting apparatus according to claim 1, wherein the common resource allocation reference is pre-configured, configured, specified or any combination thereof.

13. A transmitting apparatus, comprising:

circuitry, operative to allocate resources for a Physical Sidelink Shared Channel (PSSCH) based on a common resource allocation reference and indicate the allocated resources via a Physical Sidelink Control Channel (PSCCH) which is used by a receiving apparatus to obtain the allocated resources; and a transmitter, operative to transmit the PSCCH and the PSSCH on the allocated resources to the receiving apparatus, wherein in a case that a receiving resource pool for receiving the PSCCH and PSSCH are different, the receiving resource pool for receiving the PSSCH of the transmitting apparatus is used as the common resource allocation reference.

14. A transmitting apparatus, comprising:

circuitry, operative to allocate resources for a Physical Sidelink Shared Channel (PSSCH) based on a common resource allocation reference and indicate the allocated resources via a Physical Sidelink Control Channel (PSCCH) which is used by a receiving apparatus to obtain the allocated resources; and a transmitter, operative to transmit the PSCCH and the PSSCH on the allocated resources to the receiving apparatus, wherein in a case that multiple carriers or multiple cells are configured, a receiving resource pool of the receiving apparatus in a scheduled carrier for transmitting PSSCH is used as the common resource allocation reference.

15. A transmitting apparatus, comprising:

circuitry, operative to allocate resources for a Physical Sidelink Shared Channel (PSSCH) based on a common resource allocation reference and indicate the allocated resources via a Physical Sidelink Control Channel (PSCCH) which is used by a receiving apparatus to obtain the allocated resources; and a transmitter, operative to transmit the PSCCH and the PSSCH on the allocated resources to the receiving apparatus, wherein a resource pool is selected from one of a control resource set of the PSCCH or a resource pool of the PSCCH and is used as the common resource allocation reference for the PSSCH.

16. A receiving apparatus, comprising:

a receiver, operative to receive a Physical Sidelink Shared Channel (PSSCH) on allocated resources and a Physical Sidelink Control Channel (PSCCH); and circuitry, operative to obtain the allocated resource for the PSSCH based on a common resource allocation reference which is used by a transmitting apparatus for transmitting the PSSCH on the allocate resources, wherein a resource pool is selected from one of a receiving resource pool of the transmitting apparatus or a receiving resource pool of the receiving apparatus and is used as the common resource allocation reference.

17. A wireless communication method for a transmitting apparatus, comprising:

allocating resources for a Physical Sidelink Shared Channel (PSSCH) and indicating the allocated resources via a Physical Sidelink Control Channel (PSCCH) based on a common resource allocation reference which is used by a receiving apparatus to obtain the allocated resources; and transmitting the PSSCH on the allocated resources to the receiving apparatus, wherein a resource pool is selected from one of a receiving resource pool of the transmitting apparatus or a receiving resource pool of the receiving apparatus and is used as the common resource allocation reference.

18. A wireless communication method for a receiving apparatus, comprising:
- receiving a Physical Sidelink Shared Channel (PSSCH) on allocated resources and a Physical Sidelink Control Channel (PSCCH); and
- obtaining the allocated resources for the PSSCH based on a common resource allocation reference which is used by a transmitting apparatus for transmitting the PSSCH on the allocate resources,
- wherein a resource pool is selected from one of a receiving resource pool of the transmitting apparatus or a receiving resource pool of the receiving apparatus and is used as the common resource allocation reference.

* * * * *